Aug. 15, 1933.   F. A. BROWNE   1,922,840
PLUG VALVE
Filed Feb. 17, 1930
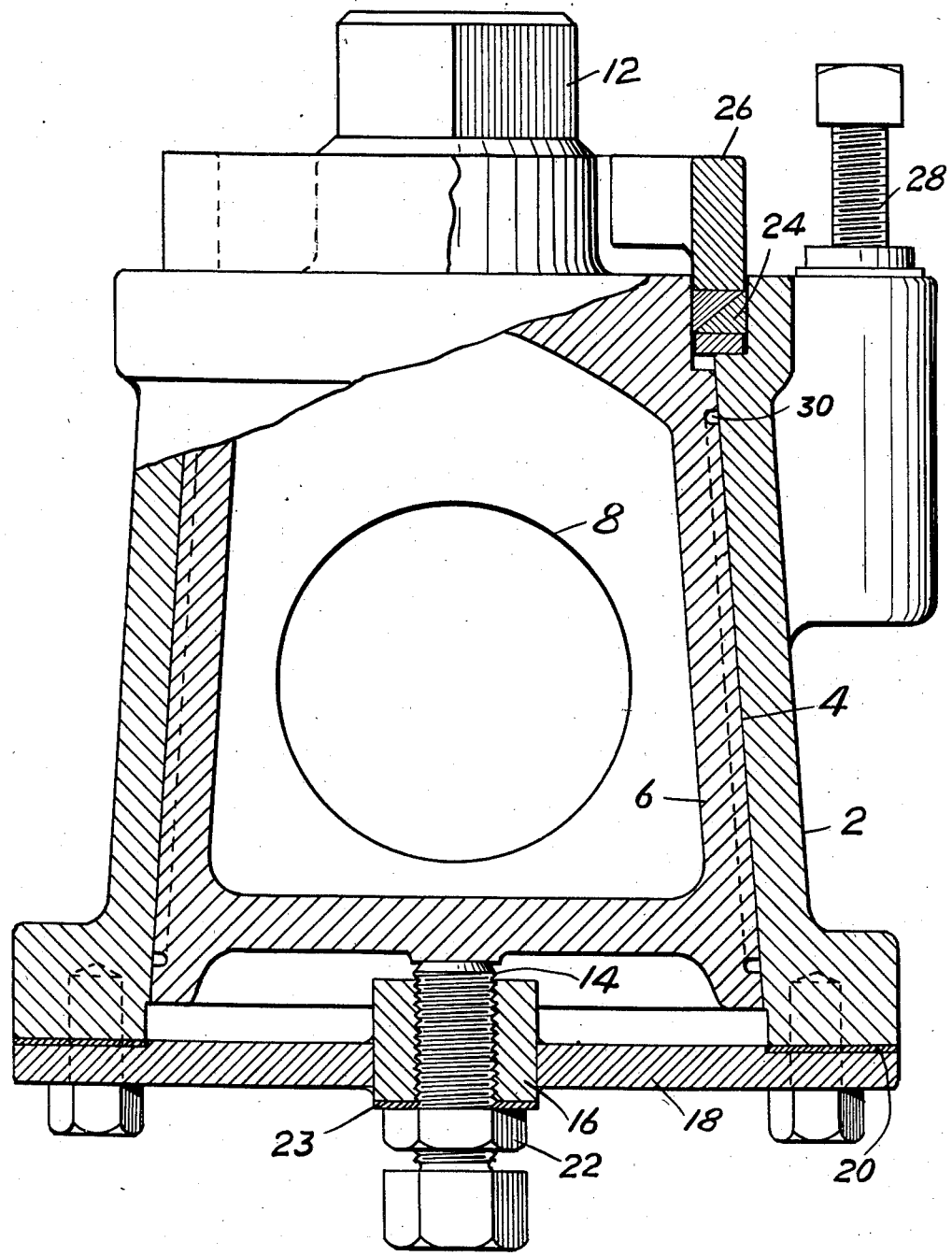
WITNESS:
INVENTOR
Frank A. Browne
BY
ATTORNEYS.

Patented Aug. 15, 1933

1,922,840

UNITED STATES PATENT OFFICE 1,922,840

PLUG VALVE

Frank A. Browne, Wayne, Pa., assignor to The Barber Asphalt Company, Philadelphia, Pa., a Corporation of West Virginia Application February 17, 1930. Serial No. 429,046

REISSUED

10 Claims. (Cl. 251—112)

This invention relates to an improvement in plug valves and specifically to improved means for maintaining the plug seated.

Heretofore the tapered plugs of plug valves have been maintained in engagement with their seats in the casings by various means, the commonest of which utilizes spiral springs to exert a yielding pressure on the plug to urge it toward its narrow end relative to the casing. When such devices are used in valves arranged to handle hot material they serve to allow for the rapid expansion of the plug as compared with the slower expansion of the valve body when, for example, the hot material is turned through the valve prior to the heating of the casing by means of steam if the valve is of the jacketed type. The springs, however, are subjected to such considerable ranges of temperature that they lose their temper and hence become ineffective.

It is accordingly the object of the present invention to provide means whereby the plug is maintained seated irrespective of extreme conditions of temperature of the various parts of the valve, the means provided being unaffected by repeated changes of temperature.

More specific objects of the invention will be apparent from the following description read in conjunction with the accompanying drawing, in which there is illustrated a vertical section through a valve embodying one modification of the invention.

The valve comprises a casing 2 formed with a tapered seat 4 in which the tapered plug 6 is rotatably supported, the plug in the present instance being hollow and provided with suitable ports 8 arranged to align with passages in the casing in the usual manner. While the valve illustrated is of the ordinary type, it may be of a jacketed type so that materials which are semi-solid at ordinary temperatures may be maintained in mobile condition. The smaller end of the plug is provided with a squared stem 12 which may be engaged by a wrench in the operation of the valve.

At the larger end of the plug there is provided an adjustable bearing screw 14 the end of which engages a central boss on the end of the plug and which is threaded through a boss 16 of steel welded in a central opening in a circular plate 18, the periphery of which is bolted to the casing with the interposition of a gasket 20 to render the connection fluid tight. The closure plate 18, which is of steel, is made of such thickness as to give the necessary degree of resilience without being strained beyond its elastic limit by the maximum change in temperature in the valve. The screw 14 is kept just tight enough to maintain the plug in seated position when the valve is cold. It is fixed in its adjusted position by a lock nut 22 which is tightened down against a gasket 23 interposed between it and the seat 16. This prevents leakage in the threads. It will be noted that the entire arrangement provides a complete closure for the end of the casing.

The smaller end of the plug is packed as indicated at 24, a gland 26 being bolted to the casing to compress this packing. Lubrication is effected through the medium of a screw 28 which forces lubricant from a suitable chamber into the lubricant distributing grooves 30 formed either in the plug, as shown, or in the seat.

By the above arrangement, it will be seen that uneven expansion such as would occur upon the turning of hot material through the valve before steam had been turned into the jacket is taken care of by the resilience of plate 18 which will maintain the plug seated under all conditions. The extreme condition is as just stated, as which time rapid expansion of the plug due to the increase in temperature will occur, as compared with the rather slower expansion of the valve body, which is heated only by conduction from the plug.

While I have more particularly illustrated and described my invention with reference to a valve of the type provided with a tapered plug, it will be understood that it is equally applicable to valves of the type having cylindrical plugs and it will be further understood that the invention may be applied to various other types of valves as, for example, gate valves, wherein the bonnet which forms a closure for the casing and contacts with and acts to support the movable valve member, or gate, may be made flexible. Thus it will be understood that I contemplate my invention as applicable to valves of various types and intend to include its application to valves variously as within the scope of the claims appended hereto.

What I claim and desire to protect by Letters Patent is:

1. A valve comprising a casing having a seat therein, a plug positioned in operative relation to said seat, means for maintaining the plug in seated operative position, said means including a flexible metallic closure for the casing secured thereto and carrying means contacting with one end of the plug and forming a bearing therefor, and means extending from the other end of the plug adapted to be engaged to effect turning of the plug.

2. A valve comprising a casing having a seat therein, a plug rotatably supported in operative relation to the seat, a flexible plate carried by the casing, and an adjustable screw carried by the plate and bearing upon the plug, said plate closing the end of the casing against leakage.

3. A valve comprising a casing having a seat therein, a plug rotatably supported in operative relation to the seat, and means for maintaining the plug seated, said means including a flexible plate carried by the casing, an adjustable screw carried by the plate and bearing upon the plug, and means forming a seal at the passage of the screw through the plate.

4. A valve comprising a casing having a seat therein, a plug rotatably supported in the seat, and means for maintaining the plug seated, said means including a flexible plate carried by the casing, an adjustable screw carried by the plate and bearing upon the plug, and a lock nut holding the screw in adjusted position.

5. A valve comprising a casing having a tapered seat therein, a tapered plug rotatably supported in the seat, and means for maintaining the plug seated, said means including a flexible plate closing the end of the casing at the larger end of the plug, and carrying means contacting with the end of the plug.

6. A valve comprising a casing having a tapered seat therein, a tapered plug rotatably supported in the seat, and means for maintaining the plug seated, said means including a flexible plate closing the end of the casing at the larger end of the plug, a boss carried by the plate at its central portion, and an adjustable screw threaded through the boss and bearing upon the plug.

7. A valve comprising a casing having a seat therein, a plug rotatably supported in the seat, and means for maintaining the plug seated, said means including a flexible plate closing the end of the casing, a boss carried by the plate at its central portion, and an adjustable screw threaded through the boss and bearing upon the plug.

8. A valve comprising a casing having a tapered seat therein, a tapered plug rotatably supported in the seat, and means for maintaining the plug seated, said means including a flexible plate closing the end of the casing at the larger end of the plug, a boss carried by the plate at its central portion, an adjustable screw threaded through the boss and bearing upon the plug, and a lock nut holding the screw in adjusted position.

9. A valve comprising a casing having a tapered seat therein, a tapered plug rotatably supported in the seat, and means for maintaining the plug seated, said means including a flexible plate closing the end of the casing at the larger end of the plug, a boss carried by the plate at its central position, an adjustable screw threaded through the boss and bearing upon the plug, and means forming a seal at the passage of the screw through the boss.

10. A valve comprising a casing having a seat therein, a plug rotatably supported in the seat, and means for maintaining the plug seated, said means including a flexible plate closing the end of the casing, a boss carried by the plate at its central portion, an adjustable screw threaded through the boss and bearing upon the plug, and means forming a seal at the passage of the screw through the boss.

FRANK A. BROWNE.